(12) United States Patent
Chang

(10) Patent No.: US 7,069,831 B2
(45) Date of Patent: Jul. 4, 2006

(54) SAWDUST COLLECTION SYSTEM FOR A CIRCULAR SAW

(76) Inventor: Chin-Chin Chang, No. 41, Nan-Tsun Rd., Hou-Li Hsiang, Taichung Hsien (TW)

( * ) Notice: Subject to any disclaimer, the term of this patent is extended or adjusted under 35 U.S.C. 154(b) by 149 days.

(21) Appl. No.: 10/920,564

(22) Filed: Aug. 18, 2004

(65) Prior Publication Data

US 2006/0037453 A1 Feb. 23, 2006

(51) Int. Cl.
*B23D 45/04* (2006.01)
(52) U.S. Cl. .................. 83/100; 83/471.3; 83/490; 83/581
(58) Field of Classification Search ............... 83/100, 83/165, 490, 478, 473, 168, 581, 98, 471.3, 83/486.1; 144/252.1; 451/453, 456; 409/137
See application file for complete search history.

(56) References Cited

U.S. PATENT DOCUMENTS

| | | | | |
|---|---|---|---|---|
| 3,525,183 | A * | 8/1970 | Gargrave | 451/453 |
| 4,255,995 | A * | 3/1981 | Connor | 83/100 |
| 5,782,153 | A * | 7/1998 | Sasaki et al. | 83/162 |
| 6,431,040 | B1 * | 8/2002 | Miller et al. | 83/100 |
| 6,742,425 | B1 * | 6/2004 | Oktavec et al. | 83/100 |
| 6,748,660 | B1 * | 6/2004 | Buser et al. | 125/12 |
| 6,988,435 | B1 * | 1/2006 | Kao | 83/100 |

* cited by examiner

*Primary Examiner*—Kenneth E. Peterson
*Assistant Examiner*—Phong Nguyen
(74) *Attorney, Agent, or Firm*—Connolly Bove Lodge & Hutz

(57) ABSTRACT

A sawdust collection system includes a sawdust duct secured in a saw blade housing and having an enlarged portion formed on a front end thereof. A sawdust chute is partially pivotally received in a lower portion of the enlarged portion of the sawdust duct such that the sawdust chute can be swung relative to the sawdust duct. A first stopper laterally outwardly extends from a bottom of the sawdust chute and a torsion spring is mounted between the sawdust duct and the sawdust chute to prevent the sawdust chute from a vibration during operating. A second stopper laterally outwardly extends from a top of the sawdust chute. The second stopper selectively abuts a distal edge of the enlarged portion for limiting the moving range of the sawdust duct.

6 Claims, 7 Drawing Sheets

SAWDUST COLLECTION SYSTEM FOR A CIRCULAR SAW

BACKGROUND OF THE INVENTION

1. Field of the Invention

The present invention relates to a sawdust collection system, and more particularly to a sawdust collection system for a circular saw.

2. Description of Related Art

As well know, a sawdust collection system is widely used to a circular saw for collecting sawing sawdust during operating the circular saw.

As regard to U.S. Pat. No. 5,819,619, Philip discloses a sawdust collection system for compound meter saw including a sawdust duct pivotally moved with the saw blade. The sawdust duct only contains a sawdust-receiving opening in its forward end for guiding sawdust thereinto. For preventing the saw blade from breaking the sawdust duct, a certain distance is arranged between the sawdust-receiving opening and the sawing edge of the saw blade. As a result, the sawdust collecting effect is reduced.

As regard to U.S. Pat. No. 5,927,171, Katsuhiko discloses a bench circular saw machine including a guide tube pivotally pivoted in the guide pass for guiding the sawdust into the guide pass and exhausted from the saw machine. An angle between the guide pass and the guide tube is adjusted due to the thumbscrew. Consequently, the operator can adjust the angle between the guide pass and the guide tube due to a thickness of the workpiece. However, the thickness of the workpiece is not uniformed such that the operator needs to often adjust the angle between the guide pass and the guide tube due to the thickness of the workpiece during operating. It is an inconvenient design.

As regard to U.S. Pat. No. 6,510,772, Brickner et al. disclose a sawdust collection system including a sawdust chute pivotally connected to the cutting unit and swing relative to the cutting unit. A bottom surface of the sawdust chute rests on a sawdust chute support due to a gravity of the sawdust chute. As to the connection of the sawdust chute, the sawdust chute may be vibrated when the saw blade is operated in a high speed. As a result, the lifetime of the sawdust chute is shortened.

The present invention has arisen to mitigate and/or obviate the disadvantages of the conventional sawdust collection systems.

SUMMARY OF THE INVENTION

The main objective of the present invention is to provide an improved sawdust collection system for a circular saw, which can effectively collect sawdust during operating the circular saw.

To achieve the objective, the sawdust collection system in accordance with the present invention comprises a sawdust duct longitudinally secured in a saw blade housing and having an enlarged portion formed on a front end of the sawdust duct. A sawdust chute is partially longitudinally received in a lower portion of the enlarged portion of the sawdust duct. A pin laterally extends the sawdust duct and the sawdust chute to pivotally mount the sawdust chute to the sawdust duct such that the sawdust chute can be swung relative to the sawdust duct. A first stopper laterally outwardly extends from a bottom of the sawdust chute and a torsion spring is sleeved on the pin. The torsion spring has a first end abutting against an inner periphery of the sawdust duct and a second end downward abutting against the first stopper to prevent the sawdust chute from a vibration during operating. A second stopper laterally outwardly extends from a top of the sawdust chute. The second stopper selectively abuts a distal edge of the enlarged portion to limit a moving range of the sawdust duct and prevent the sawdust chute from being contacted with the saw blade when the saw blade is downward moved near a base of the circular saw. A support is secured on a body of the circular saw for supporting a bottom of the sawdust chute to adjust the angle between the sawdust duct and the sawdust chute before the saw blade housing contacting with the second stopper.

Further benefits and advantages of the present invention will become apparent after a careful reading of the detailed description with appropriate reference to the accompanying drawings.

DETAILED DESCRIPTION OF THE INVENTION

Figure 1:
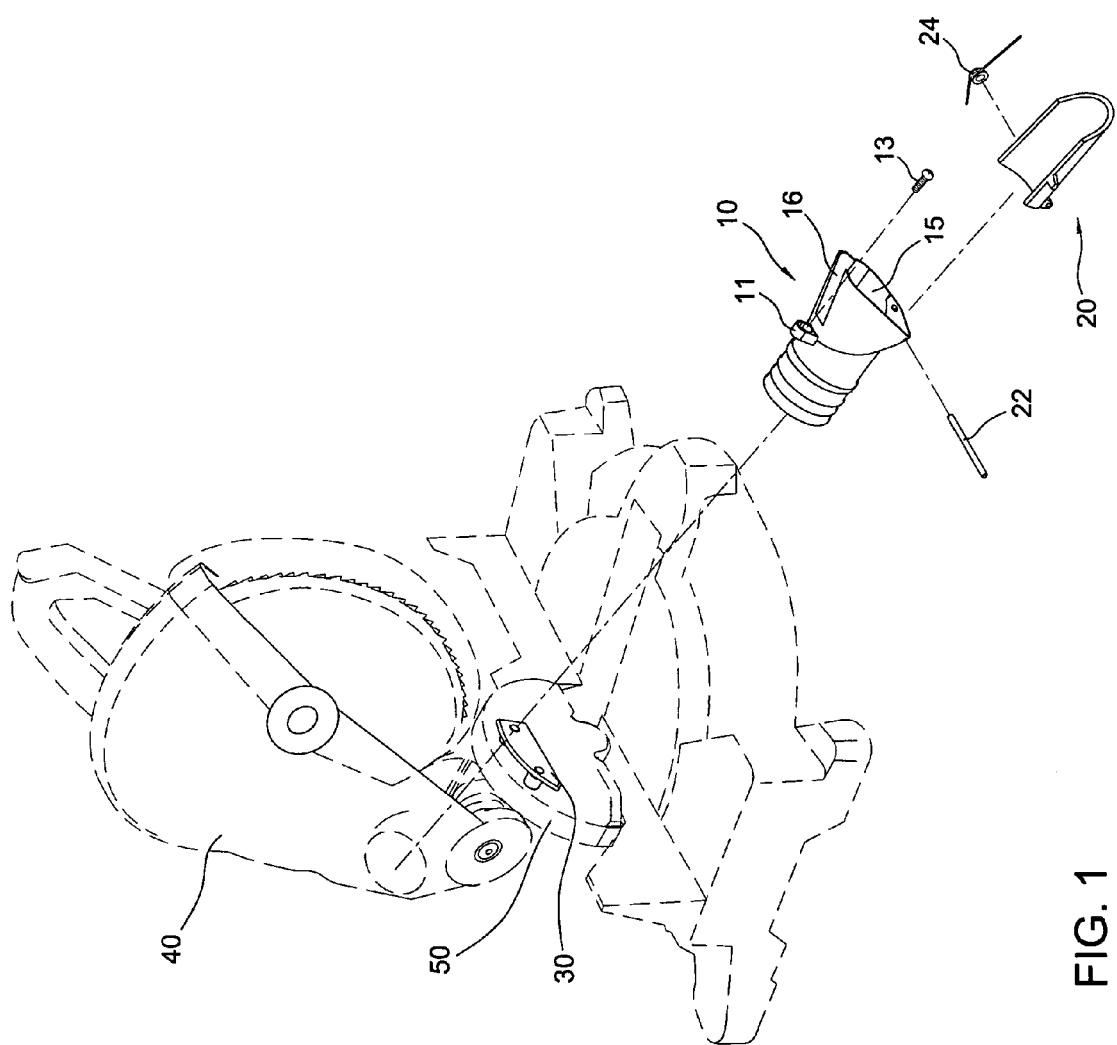
FIG. 1 is an exploded perspective view of a sawdust collection system for a circular saw in accordance with the present invention.
Figure 2:
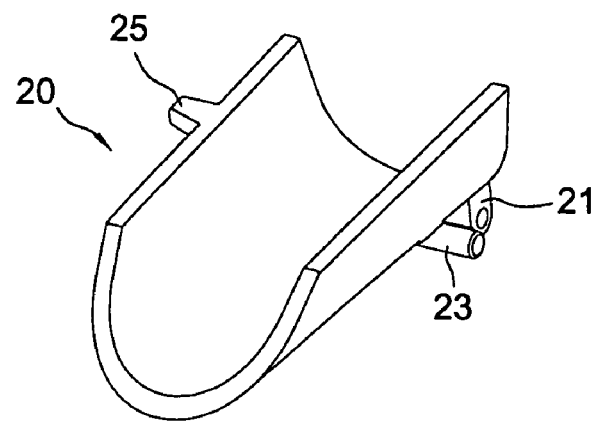
FIG. 2 is a perspective view of a sawdust chute of the present invention.
Figure 3:
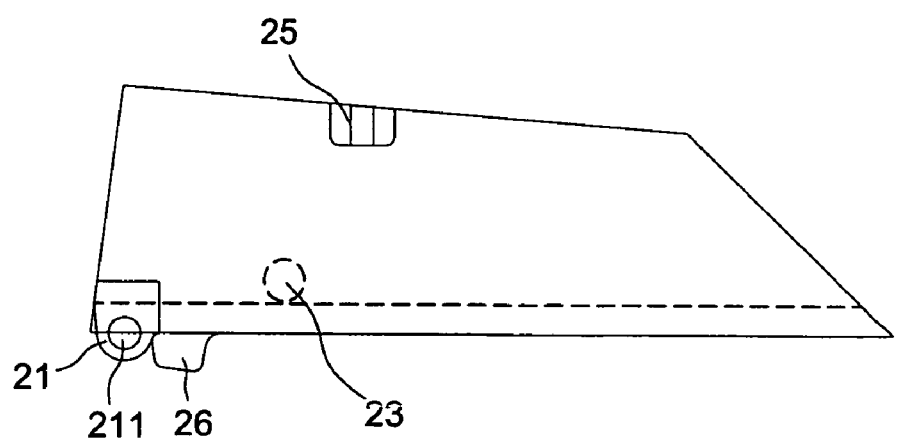
FIG. 3 is a side plan view of the sawdust chute in FIG. 3.
Figure 4:
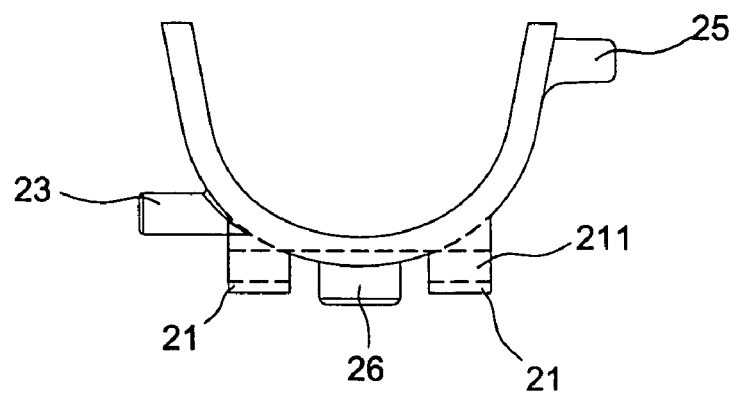
FIG. 4 is a rear plan view of the sawdust chute in FIG. 3.

Referring to the drawings and initially to FIGS. 1–6, a sawdust collection system for a circular saw in accordance with the present invention comprises a sawdust duct (10) adapted to be longitudinally mounted in a saw blade housing (40) of the circular saw, a sawdust chute (20) pivotally mounted to a front end of the sawdust duct (10) and a support (30) adapted to be secured on a body (50) of the circular saw for selectively supporting a bottom of the sawdust chute (20).

The sawdust duct (10) includes a first ear (11) and a second ear (12) respectively extending from an outer periphery of the sawdust duct (10) and diametrically corresponding to each other. A through hole (not numbered) is defined in the first ear (11) and the threaded hole (not numbered) is defined in the second ear (12). A first bolt (13) extends through the through hole and is screwed into the saw blade housing (40), and a second bolt (14) extends through the saw blade housing (40) and is screwed into the threaded hole in the second ear (12) for securely holding the sawdust duct (10) in place. The sawdust duct (10) is positioned in two opposite direction such that the present invention provides a good connection between the sawdust duct (10) and the saw blade housing (40) of the circular saw. An enlarged portion (15) is formed in the front end of the sawdust duct (10) for effectively collecting the sawdust. A slot (16) is defined in a top portion of the enlarged portion (15) of the sawdust duct (10) for separately receiving the cutting edge of the saw blade.

The sawdust chute (20) is partially longitudinally received in a lower portion of the enlarged portion (15) of the sawdust duct (10), and includes a pair of ear (21) downward extending from two opposite sides of the sawdust chute (20) within the enlarged portion (15) and each having a through hole (211) laterally defined in each of the pair of ear (21). A pin (22) laterally extends through the sawdust duct (10) and the through holes (211) of each of the pair of ear (21) to pivotally mounted to the sawdust duct (10) such that the sawdust chute (20) can be swung relative to the sawdust duct (10). A first stopper (23) laterally outwardly extends from a bottom of the sawdust chute (20). A torsion spring (24) is sleeved on the pin (22), and has first end abutting against an inner periphery of the sawdust duct (10) and a second end downward abutting against the first stopper (23) to prevent the sawdust chute (20) from a vibration during operating. A second stopper (25) laterally outwardly extends from a top of the sawdust chute (20). The second stopper (25) selectively abuts a distal end of the enlarged portion (15) to limit the moving range of the sawdust duct (10) and prevent the sawdust chute (20) from being contacted with the saw blade when the saw blade is downward moved near a base of the circular saw. A protrusion (26) downward extends from the sawdust chute (20) and abuts against the inner periphery of the sawdust duct (10) to make the sawdust duct (10) and the sawdust chute (20) smoothly adjust the angle between the sawdust duct (10) and the sawdust chute (20).

Figure 5:
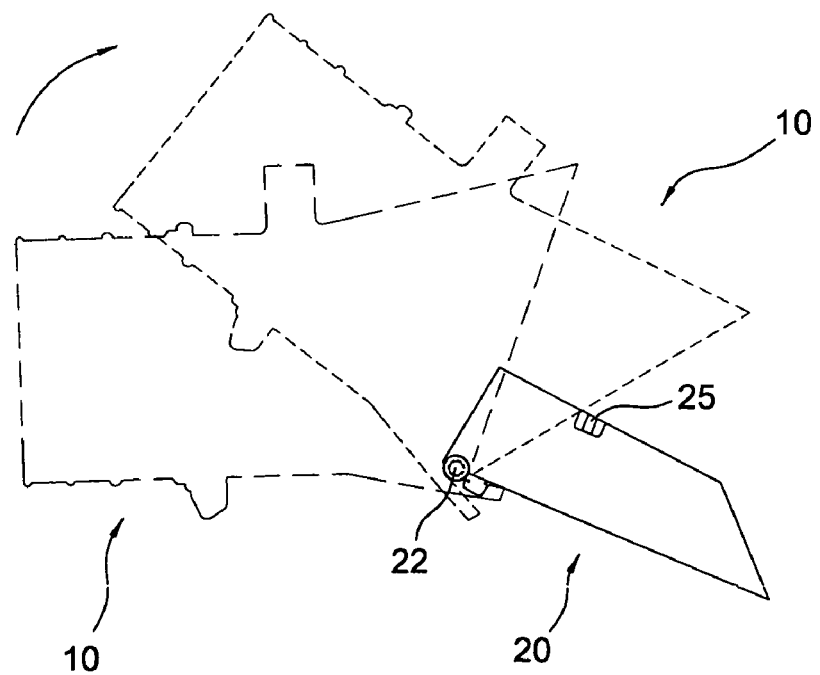
FIG. 5 is a side plan view of the sawdust duct and the sawdust chute for showing the swing relation therebetween when the enlarged portion of the sawdust duct is moved to engage to the second stopper of the sawdust chute.
Figure 6:
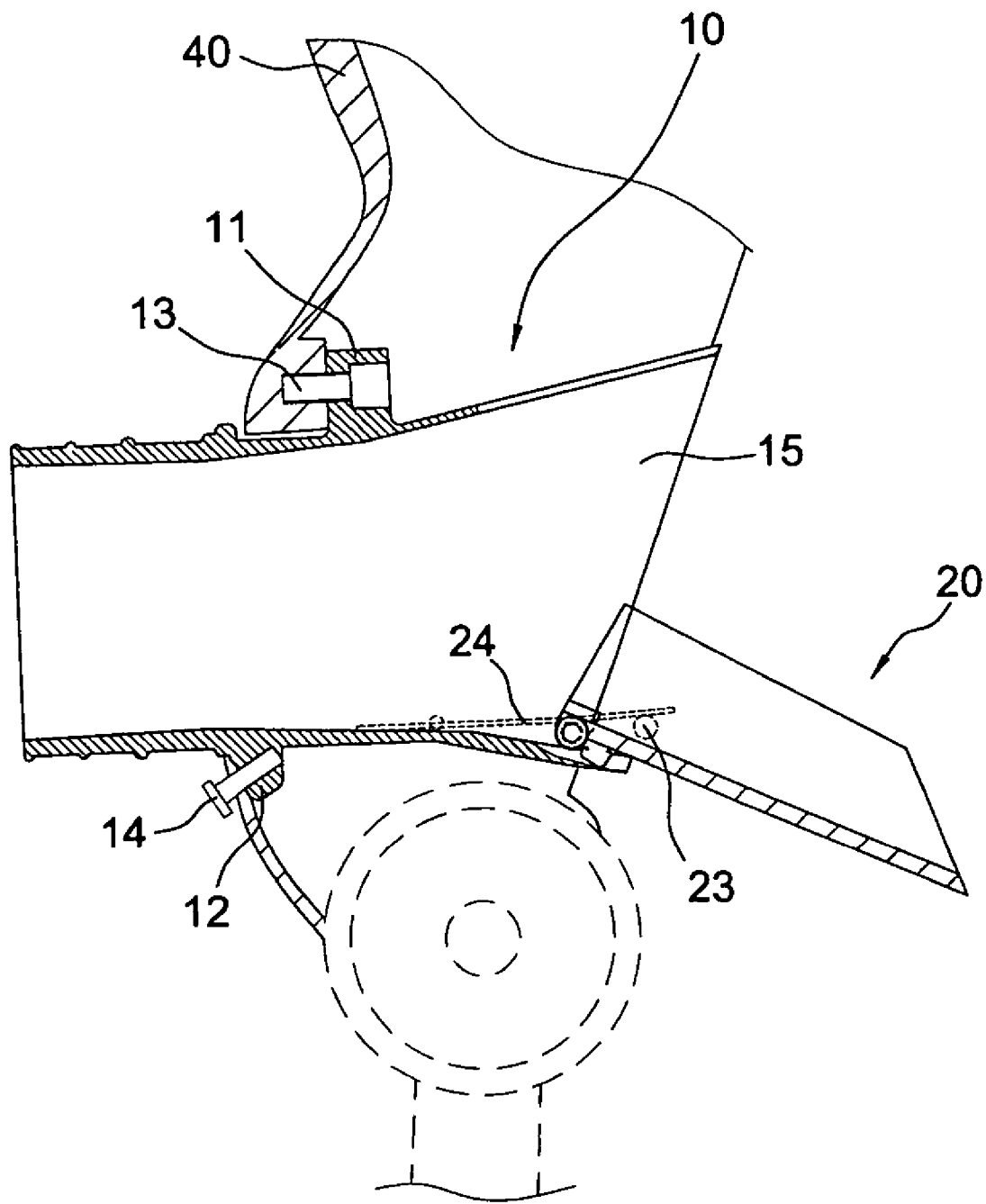
FIG. 6 is a cross-sectional view of the sawdust collection system in accordance with the present invention.
Figure 7:
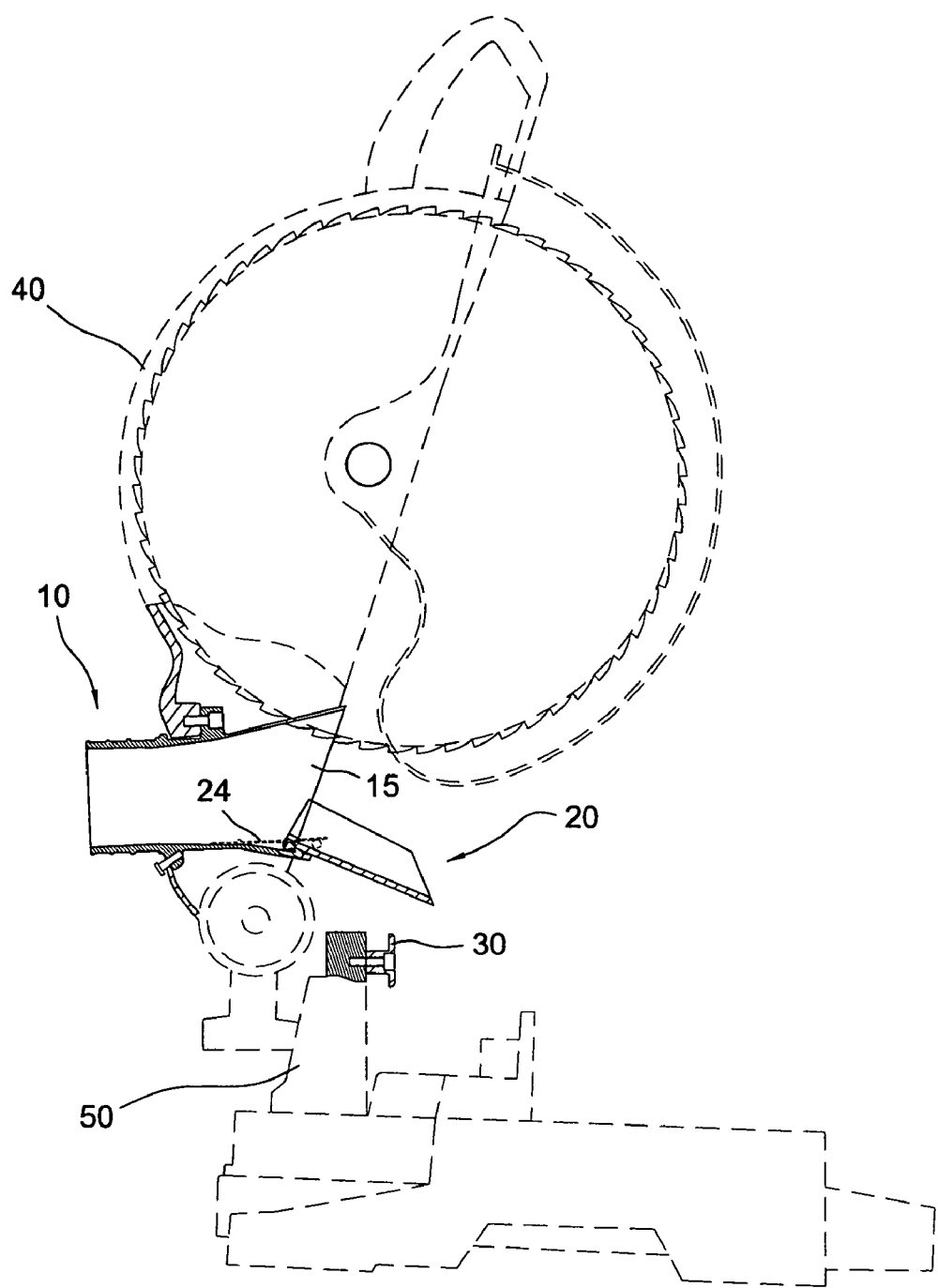
FIG. 7 is a first operational view of the sawdust collection system in accordance with the present invention.
Figure 8:
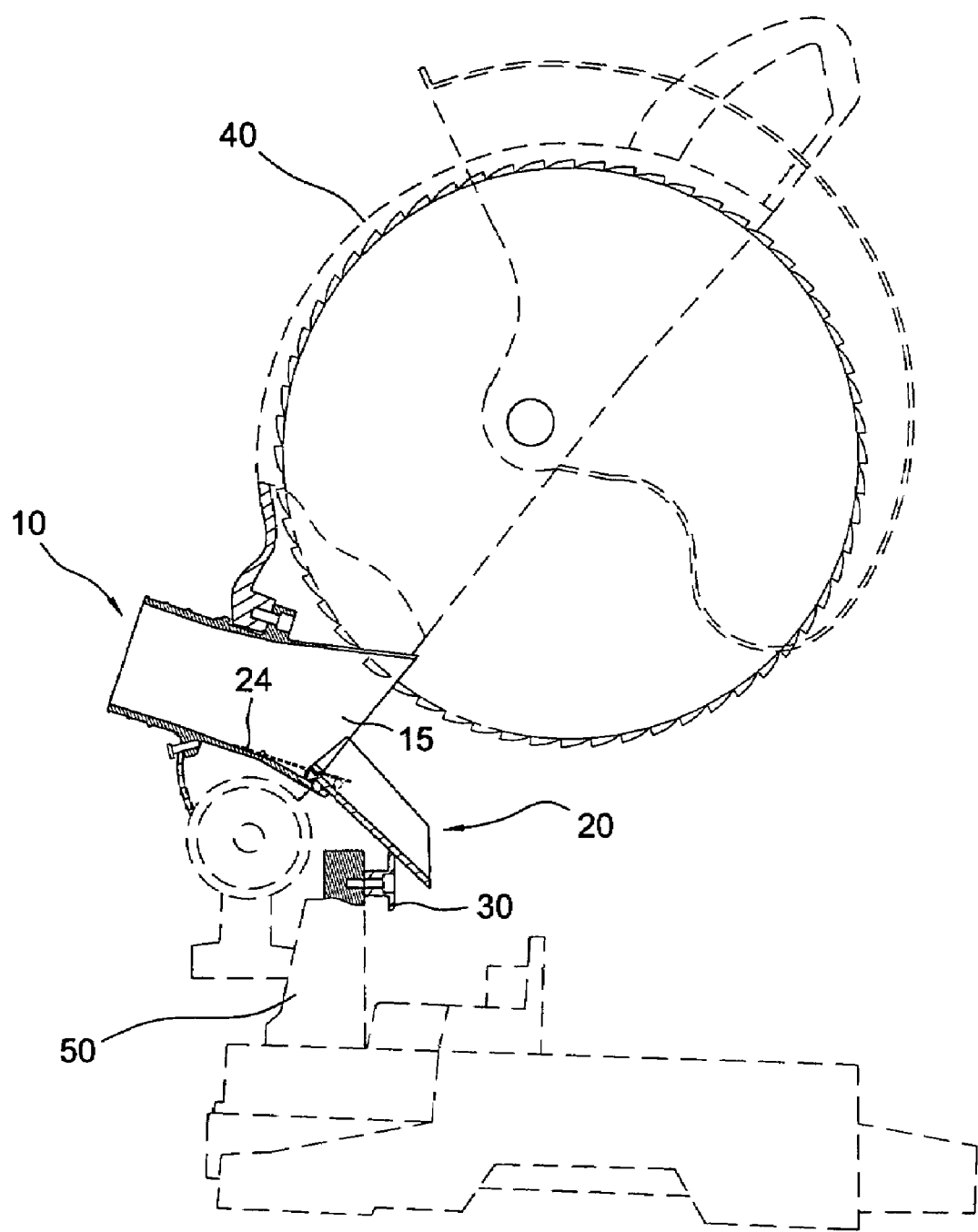
FIG. 8 is a second operational view of the sawdust collection system in accordance with the present invention.
Figure 9:
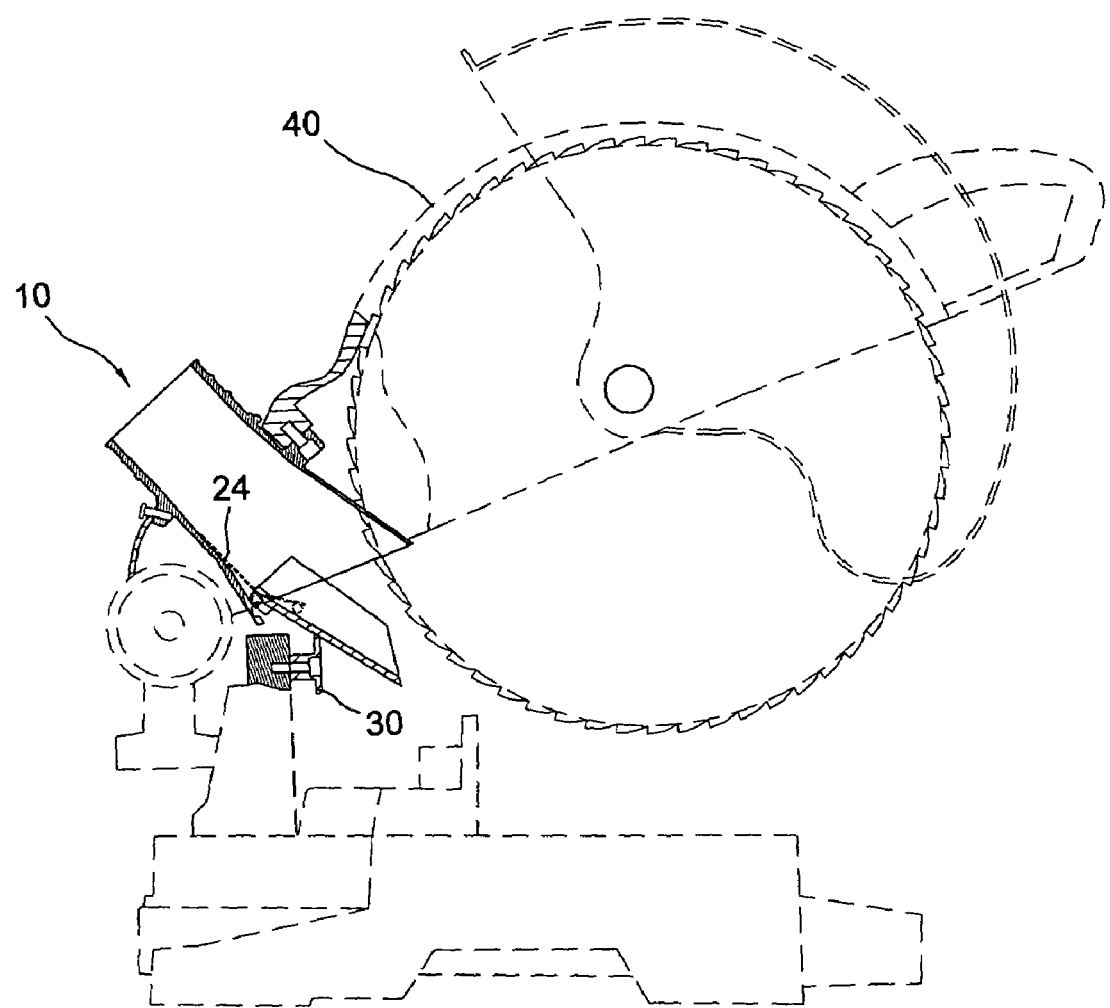
FIG. 9 is a third operational view of the sawdust collection system in accordance with the present invention.

When operating the sawdust collection system of the present invention, with reference to FIG. 7, the sawdust chute (20) downward extends due to the restitution force of the torsion spring (24) and is separated from the support (30) when the saw blade is lifted before sawing. With reference to FIG. 8, the angle between the sawdust duct (10) and the sawdust chute (20) is gradually adjusted after the sawdust chute (20) abutting against the support (30) and the saw blade being continually downward moved to saw the workpiece. At the same time, the restitution force of the torsion spring (24) ensures the sawdust chute (20) abutting against the support (30) to prevent the sawdust chute (20) from a vibration during operating. With reference to FIGS. 5 and 9, the second stopper (25) abuts against the distal edge of the enlarged portion (15) of the sawdust duct (10) to prevent the sawdust chute (20) from contacting with the saw blade when the saw blade is continually downward moved near the base (50) of the circular saw.

Although the invention has been explained in relation to its preferred embodiment, it is to be understood that many other possible modifications and variations can be made without departing from the spirit and scope of the invention as hereinafter claimed.

What is claimed is:

1. A sawdust collection system for a circular saw, comprising:
    a sawdust duct longitudinally adapted to be secured in a saw blade housing and having an enlarged portion formed on a front end of the sawdust duct, a slot defined in a top portion of the enlarged portion, the slot adapted to separately receive a saw blade of the circular saw;
    a sawdust chute partially longitudinally received in a lower portion of the enlarged portion of the sawdust duct, a pin laterally extending the sawdust duct and the sawdust chute to pivotally mounted the sawdust chute to the sawdust duct such that the sawdust chute can be swung relative to the sawdust duct, the sawdust chute including:
        a first stopper laterally outwardly extending from a bottom of the sawdust chute;
        a torsion spring sleeved on the pin, the torsion spring having a first end abutting against an inner periphery of the sawdust duct and a second end downward abutting against the first stopper to prevent the sawdust chute from a vibration during operating; and
        a second stopper laterally outwardly extending from a top of the sawdust chute, the second stopper adapted to selectively abut a distal edge of the enlarged portion of the sawdust duct to limit the moving range of the sawdust duct and prevent the sawdust chute from being contacted with the saw blade when the saw blade is downward moved near a base of the circular saw; and
    a support adapted to be secured on a body of the circular saw for supporting a bottom of the sawdust chute to adjust the angle between the sawdust duct and the sawdust chute before the saw blade housing and the enlarged portion of the sawdust duct contacting with the second stopper.

2. The sawdust collection system as claimed in claim 1, wherein the sawdust duct comprises a first ear with a through hole and a second ear with a threaded hole respectively extending from an outer periphery of the sawdust duct and diametrically corresponding to each other, a first bolt extending through the through hole and adapted to be screwed into the saw blade housing, a second bolt adapted to extend through the saw blade housing and screwed into the threaded hole in the second ear for securely holding the sawdust duct in place, thereby the sawdust duct is positioned in two opposite direction such that a good connection is provided between the sawdust duct and the saw blade housing of the circular saw.

3. The sawdust collection system as claimed in claim 1, wherein the sawdust chute comprises a pair of ear downward extending from two opposite sides thereof within the enlarged portion and each having a through hole laterally defined in each of the pair of ear, the pin extending through the pair of ear via the through holes in the pair of ear to pivotally mount the sawdust chute to the sawdust duct such that the sawdust chute can be swung relative to the sawdust duct.

4. The sawdust collection system as claimed in claim 2, wherein the sawdust chute comprises a pair of ear downward extending from two opposite sides thereof within the enlarged portion and each having a through hole laterally defined in each of the pair of ear, the pin extending through the pair of ear via the through holes in the pair of ear to pivotally mount the sawdust chute to the sawdust duct such that the sawdust chute can be swung relative to the sawdust duct.

5. The sawdust collection system as claimed in claim 3, wherein the sawdust chute comprises a protrusion downward extending from the sawdust chute and abutting against the inner periphery of he sawdust duct to make the sawdust collection system smoothly adjust the angle between the sawdust duct and the sawdust chute.

6. The sawdust collection system as claimed in claim 4, wherein the sawdust chute comprises a protrusion downward extending from the sawdust chute and abutting against the inner periphery of he sawdust duct to make the sawdust collection system smoothly adjust the angle between the sawdust duct and the sawdust chute.

* * * * *